(12) United States Patent
Synal

(10) Patent No.: US 10,958,746 B2
(45) Date of Patent: Mar. 23, 2021

(54) APPLICATION SERVER-BASED SOCIAL PRESENCE PUBLISHING

(71) Applicant: T-Mobile USA, Inc., Bellevue, WA (US)

(72) Inventor: Adrian Synal, Kirkland, WA (US)

(73) Assignee: T-Mobile USA, Inc., Bellevue, WA (US)

(*) Notice: Subject to any disclaimer, the term of this patent is extended or adjusted under 35 U.S.C. 154(b) by 8 days.

(21) Appl. No.: 16/197,153

(22) Filed: Nov. 20, 2018

(65) Prior Publication Data

US 2020/0162568 A1  May 21, 2020

(51) Int. Cl.
*H04L 29/08* (2006.01)
*H04L 29/06* (2006.01)

(52) U.S. Cl.
CPC ............ *H04L 67/24* (2013.01); *H04L 65/105* (2013.01); *H04L 65/1006* (2013.01); *H04L 65/1016* (2013.01); *H04L 67/26* (2013.01); *H04L 67/306* (2013.01)

(58) Field of Classification Search
CPC ........ A63H 30/04; B60R 25/24; G05B 15/02; G05B 19/02; G05B 19/042; G05B 19/106; G05B 2219/2642; G06F 1/3231; G06F 13/00; G06F 3/00; G06F 3/0481; G06Q 10/107; G06Q 30/0241; G06Q 10/10; G06Q 10/109; H04L 12/58; H04L 12/581; H04L 12/585; H04L 12/5855; H04L 12/1822; H04L 29/08; H04L 29/06; H04L 29/06027; H04L 29/08072; H04L 65/105; H04L 65/1006; H04L 65/1016; H04L 67/24; H04L 67/26; H04L 67/306; H04L 67/00; Y02D 10/173
USPC .................. 340/4.31; 709/206, 204; 715/751
See application file for complete search history.

(56) References Cited

U.S. PATENT DOCUMENTS

| | | | | |
|---|---|---|---|---|
| 9,574,671 B1* | 2/2017 | Amberg | ................. | H04W 64/00 |
| 2005/0113077 A1* | 5/2005 | Bushnell | ........... | H04M 3/42212 |
| | | | | 455/417 |
| 2006/0068815 A1* | 3/2006 | Caspi | .................... | H04W 88/06 |
| | | | | 455/466 |
| 2008/0126949 A1* | 5/2008 | Sharma | ................ | G06Q 10/107 |
| | | | | 715/751 |
| 2008/0235230 A1* | 9/2008 | Maes | ..................... | H04M 7/006 |
| 2009/0106677 A1* | 4/2009 | Son | ......................... | H04L 67/24 |
| | | | | 715/764 |

(Continued)

*Primary Examiner* — Robert B Harrell
(74) *Attorney, Agent, or Firm* — Han Santos, PLLC

(57) ABSTRACT

The use of application servers to publish the social presence information of users to a presence server of the wireless carrier network may reduce signaling and communication traffic between user devices and the wireless carrier network. The use of application servers may also provide social presence information publishing capabilities when user devices of users do not have such publishing capabilities or are otherwise unable to do so. An application server may receive one or more user-defined social presence settings of a user from an access portal provided by the application server. Social presence information is generated for the user based on the one or more user-defined social presence settings at the application server. The social presence information for the user is sent from the application server to a presence server of a wireless carrier network.

20 Claims, 5 Drawing Sheets

(56) References Cited

U.S. PATENT DOCUMENTS

2012/0112877 A1* 5/2012 Gravino ................ G05B 15/02
340/4.31

* cited by examiner

APPLICATION SERVER-BASED SOCIAL PRESENCE PUBLISHING

BACKGROUND

Social presence status of a user, e.g., whether the user is available for chatting online, is currently on a voice call, is away, is busy, etc. may be broadcast to other users who are trying to communicate with the user. A user may use a social presence client application on a user device to broadcast the social presence status of the user. Further, the social presence client application may also be used by the user to subscribe to the social presence statuses of other users. Such social presence communication traffic may be handled by a communication network in the form of a wireless carrier network. In some instances, the social presence communication traffic may create undesired signaling and traffic burden for the wireless carrier network. Additionally, users may have incompatible social presence client applications installed on their user devices. In other instances, a user device may restrict a user from using a particular version of a social presence client application or generally prohibit the user from using social client applications. These constraints may limit the usefulness of social presence client applications.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
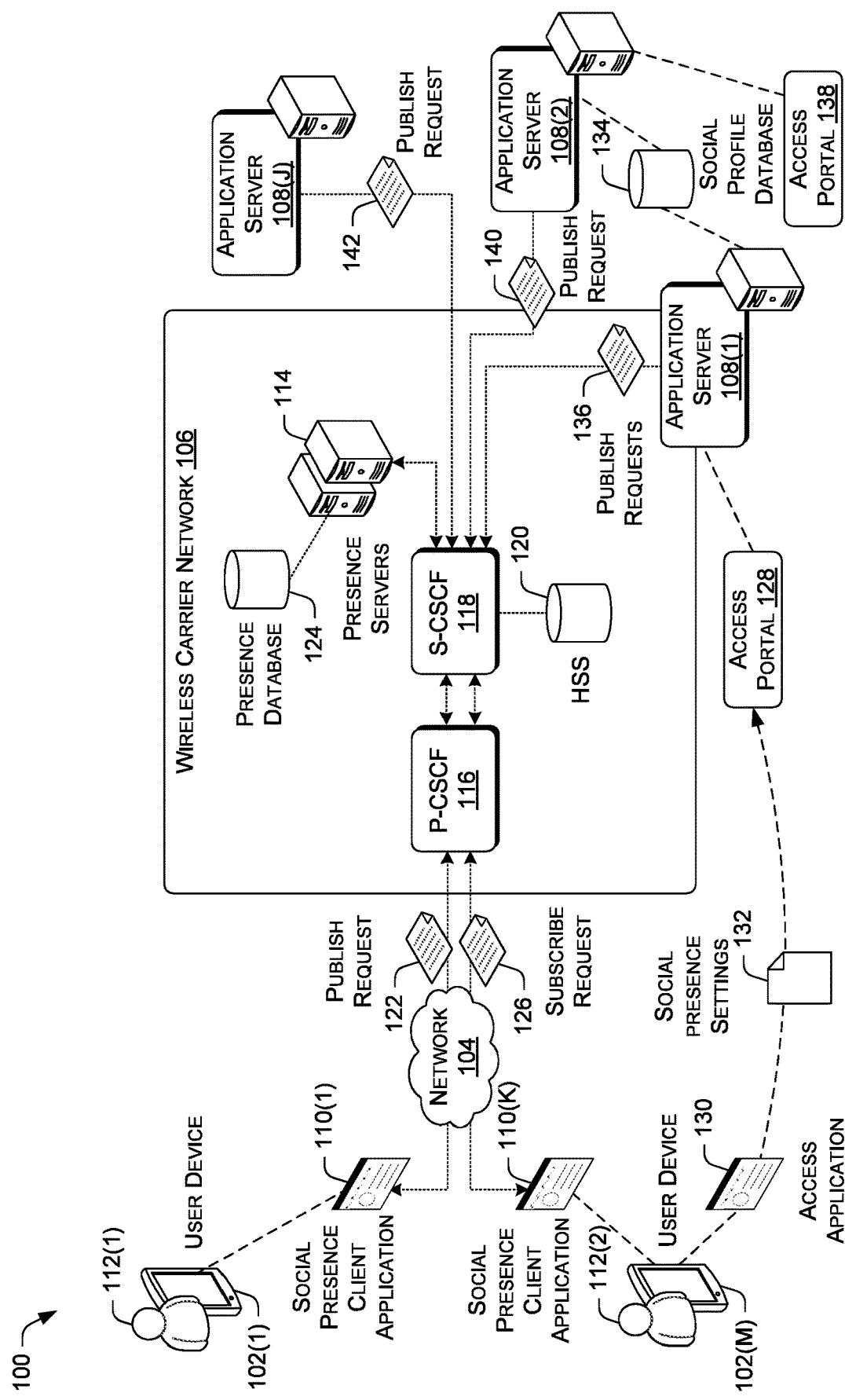
FIG. 1 illustrates an example network architecture for implementing application server-based social presence publishing.

This disclosure is directed to techniques for performing application server-based social presence publishing to a presence server of a wireless carrier network. The social presence information of a user may indicate whether the user is available for chatting online, is currently on a voice call, is in a meeting, is away, is busy, etc. In one scenario, the social presence information of a user is published by a social presence client application on a user device of the user. Accordingly, the user may input a user-defined presence status into the social presence client application. For example, the user may indicate to the social presence client application that the user is currently busy. The social presence client application may publish the social presence information to a presence server of a wireless carrier network. In turn, the presence server may broadcast the social presence information of the user to the social presence applications installed on the user devices of other users that have elected to subscribe to the social presence information of the user. Alternatively, the social presence client application may detect that a user has performed an action that affects a social presence information of the user. For example, the social presence client application may be a telephony application that determines that the user is on a voice call. Accordingly, the social presence client application may publish a social presence status update that indicates the user is on the call to the presence server of the wireless carrier network for broadcasting to other social presence client applications.

In contrast, application server-based presence publishing does not rely on the use of social presence client applications installed on user devices to publish the social presence information of users to a presence server. Instead, a user may use a web portal that is provided by an application server to upload a social presence status of the user directly to the application server. In turn, the application server publishes the social presence information of the user to the presence server of the wireless carrier network. In some embodiments, the application server may be a telephony application server (TAS) of the wireless carrier network. In other embodiments, the application server may be a third-party application server that is authorized by the wireless carrier network to publish social presence information of users to the presence server of the wireless carrier network. In some of these embodiments, an application server may have the ability to detect that a user has performed an action that affects a social presence information of the user, and correspondingly publish a social presence information update to the presence server.

The use of application servers to publish the social presence information of users to a presence server of the wireless carrier network may reduce signaling and communication traffic between user devices and the wireless carrier network. Such reductions in signaling and communication traffic may increase the available communication bandwidth of the wireless carrier network for handling other communication tasks. Further, application server-based social presence publishing makes it possible for users to broadcast their social presence information to other users even when their user devices are unable to or are restricted from supporting social presence client applications, when the user devices are offline, or when the users are using incompatible social presence client applications. Additionally, the shifting of social presence information publishing from social presence client applications to application servers may reduce the use of computing resources by the user devices, thereby freeing up the computing resources for performing other tasks. The techniques described herein may be implemented in a number of ways. Example implementations are provided below with reference to the following figures.

Example Network Architecture

FIG. 1 illustrates an example network architecture 100 for implementing application server-based social presence publishing. The network architecture 100 may include user devices 102(1)-102(M), a network 104, a wireless carrier network 106, and application servers 108(1)-108(J). Each of the user devices 102(1)-102(M) may be a desktop computer, a laptop computer, tablet computer, a smartphone, a smartwatch, a personal digital assistant (PDA), or any other computing device that is capable of communicating with other devices via the network 104. The user devices 102(1)-102(M) may be equipped with corresponding social presence client applications 110(1)-110(K). In one scenario, the user device 102(1) may be configured to publish the social presence of a user 112(1) to one or more presence servers 114, as well as subscribe to the social presence information of other users from the presence servers 114. Likewise, the user device 102(M) may be configured to publish the social presence of a user 112(2), as well as subscribe to the social presence information of other users from the presence servers 114. The presence servers 114 may be operated by the wireless carrier network 106.

The social presence client applications 110(1)-110(K) may use the network 104 to communicate with the presence servers 114. The network 104 may include a satellite network, a local area network (LAN), the wireless carrier network 106, a larger network such as a wide area network (WAN), and/or a collection of networks, such as the Internet. The wireless carrier network 106 may provide telecommunication and data communication in accordance with one or more technical standards, such as Enhanced Data Rates for GSM Evolution (EDGE), Wideband Code Division Multiple Access (W-CDMA), High-Speed Packet Access (HSPA), Long Term Evolution (LTE), $5^{th}$ Generation (5G) wireless systems, CDMA-2000 (Code Division Multiple Access 2000), and/or so forth.

The wireless carrier network 106 may include a radio access network and a core network. The radio access network may include multiple base stations. The multiple base stations are responsible for handling voice and data traffic between multiple user devices, such as the user devices 102(1)-102(M), and the core network. Accordingly, each of the base stations may provide a corresponding network cell that delivers telecommunication and data communication coverage. The core network may use the network cells to provide communication services to the multiple user devices.

In various embodiments, the core network of the wireless carrier network 106 may include an IP Multimedia Subsystem (IMS) core. The IMS core may be accessed via one or more servers and related components that are tasked with providing connectivity between the wireless carrier network 106 and the user devices 102(1)-102(M) by acting as a point of entry and exit for data traffic. In turn, the IMS core may provide the user devices 102(1)-102(M) with data access to external packet data networks, such as the networks of other wireless carrier networks. The IMS core may include a Proxy Call Session Control Function (P-CSCF) 116 or an equivalent function. The P-CSCF 116 may route incoming Session Initiation Protocol (SIP) messages to an IMS registrar server. The P-CSCF 116 may also safeguard the security of the IMS core by handling Internet Protocol Security (IPSec) for communications that are exchanged with user devices. In some alternative instances, instead of SIP sessions, the P-CSCF 116 may handle Remote Authentication Dial-In User Service (RADIUS) sessions. The P-CSCF 116 may interact with a Serving CSCF (S-CSCF) 118. The S-CSCF 118 may communicate with a TAS that resides in the core network, as well as the presence servers 114. Collectively, the CSCFs may handle SIP sessions, which are communication sessions for packet-based voice and video calls, instant messaging over IP networks, routing of social presence information to the presence server 114, and/or so forth. Accordingly, the CSCFs may use network subscriber information that is stored in the Home Subscriber Server (HSS) 120, or alternatively, a Home Location Register (HLR), to perform their functions.

The TAS may route voice and/or data communications within the wireless carrier network and with other networks, including public switch telephone networks (PSTNs). For example, the TAS may handle IP telephony for voice over LTE (VoLTE) services. In various embodiments, application server 108(1) may be a TAS server of the wireless carrier network 106. The core network of the wireless carrier network 106 may further include a billing function. The billing function may enable the wireless carrier network to monitor the services that are used by subscribers and/or other parties and charge these entities based on service usage. In various embodiments, the billing function may be an Online Charging System (OCS) or another equivalent core network component of the wireless carrier network 106.

Each of the social presence client applications 110(1)-110 (K) is configured to publish a social presence status of a corresponding user to the presence server 114, as well as receive notifications regarding the social presence statuses of other users. In one scenario, the social presence client application 110(1) of the user 112(1) may send a social presence publish request 122 to a presence server. For example, the publish request 122 may be a SIP PUBLISH request. The publish request 122 may include a user identifier of the user 112(1) and social presence information for the user 112(1). In various embodiments, the information may include a location of the user 112(1), a current social presence status of the user 112(1), and/or one or more communication capabilities of the user 112(1). The location of the user may be home, office, out of the country, etc. The current social presence status of a user may be online, offline, busy, in a meeting, away, do not disturb, out-of-office, etc. The communication capabilities of a user may indicate how the user may be contacted, such as via voice call, video call, text messaging, and/or so forth. The social presence client application 110(1) may generate the social presence publish request 122 based on an input of the user 112(1). Alternatively, the social presence client application 110(1) may detect an action of the user 112(1) that affects a social presence status of the user 112(1), and automatically generate the social presence publish request 122. For example, the social presence client application 110(1) may be a telephony application that determines that the user is on a voice call. Accordingly, the social presence client application 110(1) may send the social presence publish request 122 to indicate that the user is on the call.

In some embodiments, the social presence publish request 122 may be routed to a specific presence server via the network 104, the P-CSCF 116, and the S-CSCF 118. The specific presence server may be one of the presence servers 114 that is responsible for handling the social presence status of the 112(1). For example, when the publish request 122 is routed to the S-CSCF 118, the S-CSCF 118 may check the user identifier of the user 112(1) included in the publish request 122 against the HSS 120 to determine the responsible presence server. Subsequently, the S-CSCF 118 may route the publish request 122 to the responsible presence server. In turn, the responsible presence server may store the social presence information in a database that is solely accessible by the responsible presence server. In other embodiments, the presence servers 114 may be configured such that social presence information of multiple users is stored in a presence database 124 that is commonly accessible by all of the presence servers 114. In such embodiments, the S-CSCF 118 may route the publish request 122 to any of the presence servers 114 so that the social presence information of the user 112(1) may be stored in the presence database 124.

The user 112(2) may be someone that is interested in the social presence information of the user 112(1). Accordingly, the social presence client application 110(K) on the user device 102(M) may subscribe to the social presence status of the user 112(1). The social presence client application 110 (K) may send a social presence information subscribe request 126 to the presence servers 114 to retrieve the social presence information of the user 112(1). For example, the subscribe request 126 may be a SIP SUBSCRIBE request. The subscribe request 126 is routed to the S-CSCF 118 via the network 104 and the P-CSCF 116.

In embodiments in which a specific presence server of the presence servers 114 is responsible for handling the social presence information of the user 112(1), the S-CSCF 118 may use a user identifier of the user 112(1) included in the subscribe request 126 to identify the responsible server. Subsequently, the S-CSCF 118 may route the subscribe request 126 to the responsible presence server. In turn, the responsible presence server may send a notification of the social presence information of the user 112(1) to the social presence client application 110(K). However, in embodiments in which social presence information of multiple users are stored in the commonly accessible presence database 124, the S-CSCF 118 may route the subscribe request 126 to one of the presence servers 114 for handling notification of the social presence information to the social presence client application 110(K). In various embodiments, each of the social presence client applications 110(1) and 110(K) is capable of sending both publish requests and subscribe requests to publish the social presence information of a user and receive social presence information of other users. Thus, the discussion of the publish request 122 with respect to the social presence client application 110(1) and the subscribe request 126 with respect to the social presence client application 110(2) are illustrative rather than limiting.

In other scenarios, the application servers 108(1)-108(J) may handle requests to update the social presence information of the users, such as the user 112(1) and 112(2), in place of social presence client applications. In one implementation, the application server 108(1) may be a TAS server of the wireless carrier network 106. The application server 108(1) may provide an access portal 128 that enables users to input one or more social presence settings. In some instances, the access portal 128 may be a web portal that is implemented using Web Real-Time Communication (WebRTC) or application program interfaces (APIs). For example, the user may interface with the access portal 128 via an access application 130 on the user device 102(M). The access application 130 may be a web browser or a web client application. In some instances, a user may use the access application 130 to interact with the access portal 128 to send social presence settings to a presence server, such as the application server 108(1). This may be due to the user 112(2) being unable to obtain access to or otherwise use the social presence client application 110(K) to send a social presence publish request to the presence servers 114.

The access portal 128 may provide an interface that enables a user to input one or more user-defined social presence settings. Accordingly, the user 112(1) may log in to the application server 108(1) via a user identifier and an authentication credential. Once the user identifier and the authentication credential have been validated, the user 112 (1) may input one or more user-defined social presence settings 132. For example, the user 112(1) may indicate via the one or more user-defined social presence settings 132 that the user 112(1) is going to be out-of-office for a specific date and time range in the future, and that the user 112(1) is only reachable by voice calls at a particular phone number during specific hours each day of the office absence. The one or more user-defined social presence settings are stored by the application server 108(1) in a social profile database 134.

Subsequently, when a start date and time of the specific date and time range arrives, the application server 108(1) may generate the corresponding social presence information based on the one or more user-defined social presence settings stored for the user 112(1) in the social profile database 134. The social presence information for the user 112(1) is then published by the application server 108(1) to the presence servers 114. Similarly, when the end of the specific date and time range arrives, the application server 108(1) may generate default social presence information (e.g., the user is offline) for publishing to the presence servers 114. In various embodiments, the application server 108(1) may use publish requests 136 to send the social presence information to the presence servers 114. The publish requests 136 may use the same protocol as the publish requests that originate from the social presence client applications 110(1)-110(K). For example, the publish requests 136 may be SIP PUBLISH requests that are routed to a presence server via the S-CSCF 118. In turn, the presence server may handle the publish requests 136 in the same manner as publish requests from social presence client application (e.g., the publish request 122). In this way, the application server 108(1) may update the social presence information for the user 112(1) even when the social presence client application 110(1) is offline or otherwise unavailable.

In another implementation, the wireless carrier network 106 may permit third-party application servers, such as the application servers 108(2) and 108(J), to send social presence publish requests to the presence servers 114 on behalf of users. In some instances, a third-party application server may function in a similar manner as the application server 108(1). For example, the application server 108(2) may receive one or more user-defined social presence settings of the user 112(2) via an access portal 138 following authentication of the user. In such an example, the user 112(2) may use the access application 130 to interact with the access portal 138. In some instances, multiple application servers may store the received user-defined social presence settings in a common social profile database. For example, the application servers 108(1) and 108(2) may store user-defined social presence settings in the same social profile database 134. Further, the application server 108(2) may generate publish requests 140 to send the social presence information to the presence servers 114. For example, the publish requests 140 may be SIP PUBLISH requests that are routed to a presence server of the wireless carrier network 106 via the S-CSCF 118.

The application server 108(J) may generate presence status information for users, such as the users 112(1) and 112(2), based on the actions of the users. In various embodiments, the application server 108(J) may receive an indication that the user has performed an action with respect to the application. The application may be an application that executes on the application server 108(J), on a different server, or on a user device. For example, the user 112(2) may use the access application 130 to perform an action with respect to an application on the application server 108(J) or a server that is in communication with the application server 108(J). In another example, the application server may use a monitoring function to detect that a user has performed an action with respect to the application on the application server 108(J). In an additional example, an application server or a user device may use the network 104 to send a notification message to the application server 108(J) indicating that the action has been performed at an application on the application server or the user device. Accordingly, if the application server 108(J) determines that the action affects a social presence status of the user, the application server 108(J) may generate social presence information based on the action.

For example, the application server 108(J) may be a web conference server that hosts peer-level web meetings. The application server 108(J) may detect that a user has joined a web meeting via a conference application executing on the application server 108(J). In turn, the application server 108(J) may be configured to generate social presence information for the user that indicates the social presence status of the user is "in a meeting." The social presence information is then sent by the application server 108(J) to the presence servers 114 via a publish request. Subsequently, the application server 108(J) may detect that the user has initiated a screen share function at a user device as a part of a web meeting. In turn, the application server 108(J) may be configured to generate social presence information for the user that indicates the social presence status of the user is "do not disturb." The social presence information is then sent by the application server 108(J) to the presence servers 114 via another publish request. Subsequently, the application server 108(J) may detect that the user has exited the screen share function during the web meeting. In turn, the application server 108(J) may generate social presence information for the user that indicates the social presence status of the user is once again "in a meeting", which is then sent via a publish request. Finally, when the user has exited the web meeting, the application server 108(J) may generate social presence information for the user that indicates the social presence status of the user is "available", which is also sent via a publish request. The publish requests 142 that are sent by the application server 108(J) may be SIP PUBLISH requests that are routed to a presence server of the wireless carrier network 106 via the S-CSCF 118. While the automatic generation of social presence information is described with respect to a third-party application server, the TAS server (e.g., the application server 108(1)), may be capable of performing similar functions in additional embodiments. In some instances, the social presence information that is received by the presence servers 114 from multiple application servers may be in different data formats. Accordingly, the presence servers 114 may include data adaptors that interface with different application servers and convert the obtained social presence information of different formats into a standard data format for storage. In other instances, the application servers may be configured to provide social presence information that conforms to a standard data format to the presence servers 114 regardless of the service provider.

In some embodiments, the billing function of the wireless carrier network 106 may charge a user for the social presence publish requests of the user that are received via an application server. Alternatively, or concurrently, the billing function may charge an operator of a third-party application server for the social presence publish requests that are received from the third-party application server. The billing may be performed based on a set fee for each multiple (e.g., five, ten, etc.) of publish requests received. Volume-based escalated billing or discounted billing may also be performed, such that the fee per each received publish request from a user or an operator may increase or decrease based on the overall volume of the publish requests received in a predetermined time period from the user or the operator. Other billing arrangements for a user or an operator may include a recurring flat fee (e.g., weekly fee, monthly fee, etc.), a one-time fee, and/or so forth.

Example Application Server Components

Figure 2:
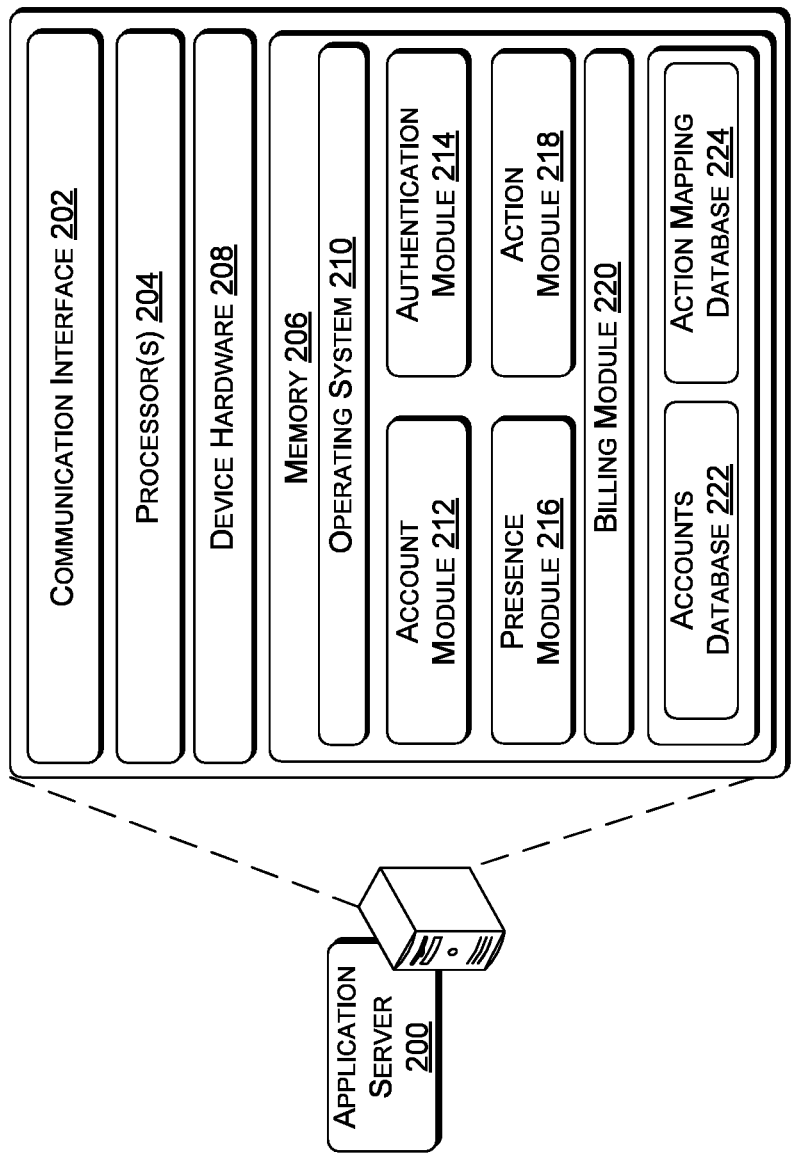
FIG. 2 is a block diagram showing various components of an application server that performs application server-based social presence publishing.

FIG. 2 is a block diagram showing various components of an application server 200 that performs application server-based social presence publishing. In various embodiments, the application server 200 may represent one of the application servers 108(1)-108(J). The application server 200 may include a communication interface 202, one or more processors 204, memory 206, and hardware 208. The communication interface 202 may include wireless and/or wired communication components that enable the application server 200 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the application server 200 or components thereof may be virtual computing devices in the form of virtual machines or software containers that are hosted in a computing cloud.

The processors 204 and the memory 206 of the application server 200 may implement an operating system 210. The operating system 210 may include components that enable the application server 200 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The processors 204 and the memory 206 of the application server 200 may further implement an account module 212, an authentication module 214, a presence module 216, an action module 218, and a billing module 220. The modules may include routines, code segments, program instructions, objects, and/or data structures that are executable by the processors 204 to perform particular tasks or implement particular abstract data types.

The account module 212 may register users that desire to use an access portal, such as the access portal 128, to input social presence settings. Each user may establish a corresponding customer account by providing registration information. The registration information may include a user name, user contact information, user authentication information, and/or so forth. The user authentication information may include a user identifier, an associated user identifier that the user uses with a third-party partner of the wireless carrier network 106, an authentication credential, and/or so forth. In some embodiments, the user identifier may be a subscriber access identifier that is assigned by the wireless carrier network 106 to identify the user as a subscriber of the wireless carrier network 106. The subscriber access identifier is used by the wireless carrier network 106 to authenticate the user for the purpose of providing the user with access to services and/or applications that are hosted by the wireless carrier network 106, as well as hosted by third-party resource providers. The authentication credential may be a password, biometric data, or some other user secret. The account information of the users may be stored in an accounts database 222. In some instances, the accounts database 222 may be a part of a network subscriber database, e.g., the HSS 120 or an equivalent HLR.

The authentication module 214 may use the user authentication information stored in the accounts database 222 to grant or deny user access to the access portal for the purpose of updating social presence information. In various embodiments, a user may submit user authentication information (e.g., username, password) to the authentication module 214. In turn, the authentication module 214 may authenticate the user by validating the user authentication information to the stored user authentication information of registered users in the accounts database 222.

In instances in which the application server 200 represents the application server 108(1), the application server 200 may allow a user to authenticate via a user identifier that the user registered with an affiliated third-party partner of the wireless carrier network 106. In such instances, the authentication module 214 may receive submitted user authentication information that includes a user identifier that is associated with a registered user of the wireless carrier network 106, but the user identifier is not directly registered with the wireless carrier network 106. For example, the user identifier may be an associated user identifier that the user uses with a third-party partner of the wireless carrier network 106. Accordingly, the authentication module 214 may use a portion of the user identifier (e.g., an email suffix, a domain name, etc.) to determine that the associated user identifier is affiliated with a third-party partner. Subsequently, the authentication module 214 may use the accounts information stored in the accounts database 222 to determine that the user identifier maps to a registered user of the wireless carrier network 106. Accordingly, the authentication module 214 may forward the user authentication information to the third-party partner for authentication or direct the user to re-submit the user authentication information directly to the third-party partner via an embedded third-party partner login interface. Thus, the authentication module 214 may grant the user access to the access portal when an authentication mechanism of the third-party partner reports to the authentication module 214 that the user authentication information is validated.

The presence module 216 may provide a user with an access portal, such as the access portal 128, following authentication of the user by the authentication module 214. The portal may include interface screens that enable the user to input one or more social presence settings. For example, the user 112(1) may indicate via the one or more user-defined social presence settings 132 that the user 112(1) is going to be out-of-office for a specific date and time range in the future, and that the user 112(1) is only reachable by voice calls at a particular phone number during specific hours each day of the office absence. The social presence settings are then used by the presence module 216 to generate the corresponding social presence information for the user for publishing to a presence server of the wireless carrier network 106 at appropriate dates/times. The generation may be performed by a conversion algorithm of the presence module 216 that converts one or more inputted social presence settings into presentable social presence information. In the example above, when the specific date and time arrives, the presence module 216 may generate social presence information indicating that the user 112(1) is out-of-office. At specific hours of each day, the presence module 216 may generate updated social presence information that indicates the user is out-of-office but reachable via the particular phone number. At the end of the specific date and time range, the presence module 216 may generate additional social presence information that reverts the social presence of the user to a default status (e.g., offline). The presence module 216 may publish such social presence information to a presence server of the wireless carrier network 106.

In some instances, the application server 200 may be equipped with an action module 218 that generates presence status information for a user based on the actions of the user. In such instances, the application server 200 may perform functionalities that provide network resources, such as data and services, to the user. For example, the application server 200 may be a web conference server that hosts peer-level web meetings. In these instances, the user may authorize the application server 200 to monitor or receive reports regarding actions performed by the user as the user consumes the network resources provided by the application server 200. Accordingly, when the action module 218 detects that an action of the user affects a social presence status of the user, the action module 218 may generate social presence information for publishing to a presence server of the wireless carrier network 106 via a publish request. In some embodiments, the generation of the social presence information for a particular action may be performed using an action mapping database 224 that maps specific actions to particular sets of social presence information. Thus, actions that are not listed in the action mapping database 224 do not result in the generation of social presence information for publishing.

For example, when the action module 218 detects that the user has initiated a screen share function at a user device as a part of a web meeting, the action module 218 may generate social presence information for the user that indicates the social presence status of the user is "do not disturb." Subsequently, the action module 218 may detect that the user has exited the screen share function but is still in the web meeting. In turn, the action module 218 may generate social presence information for the user that indicates the social presence status of the user is "in a meeting".

The billing module 220 may bill a user for sending social presence publish requests to a presence server of the wireless carrier network 106 on behalf of the user. The billing may be performed based on a set fee for each multiple (e.g., five, ten, etc.) of publish requests sent. Volume-based escalated billing or discounted billing may also be performed, such that the fee per each sent publish request for the user may increase or decrease based on the overall volume of the publish requests sent in a predetermined time period for the user. Other billing arrangements for the user may include a recurring flat fee (e.g., weekly fee, monthly fee, etc.), a one-time fee, and/or so forth.

Example Processes

Figure 3:
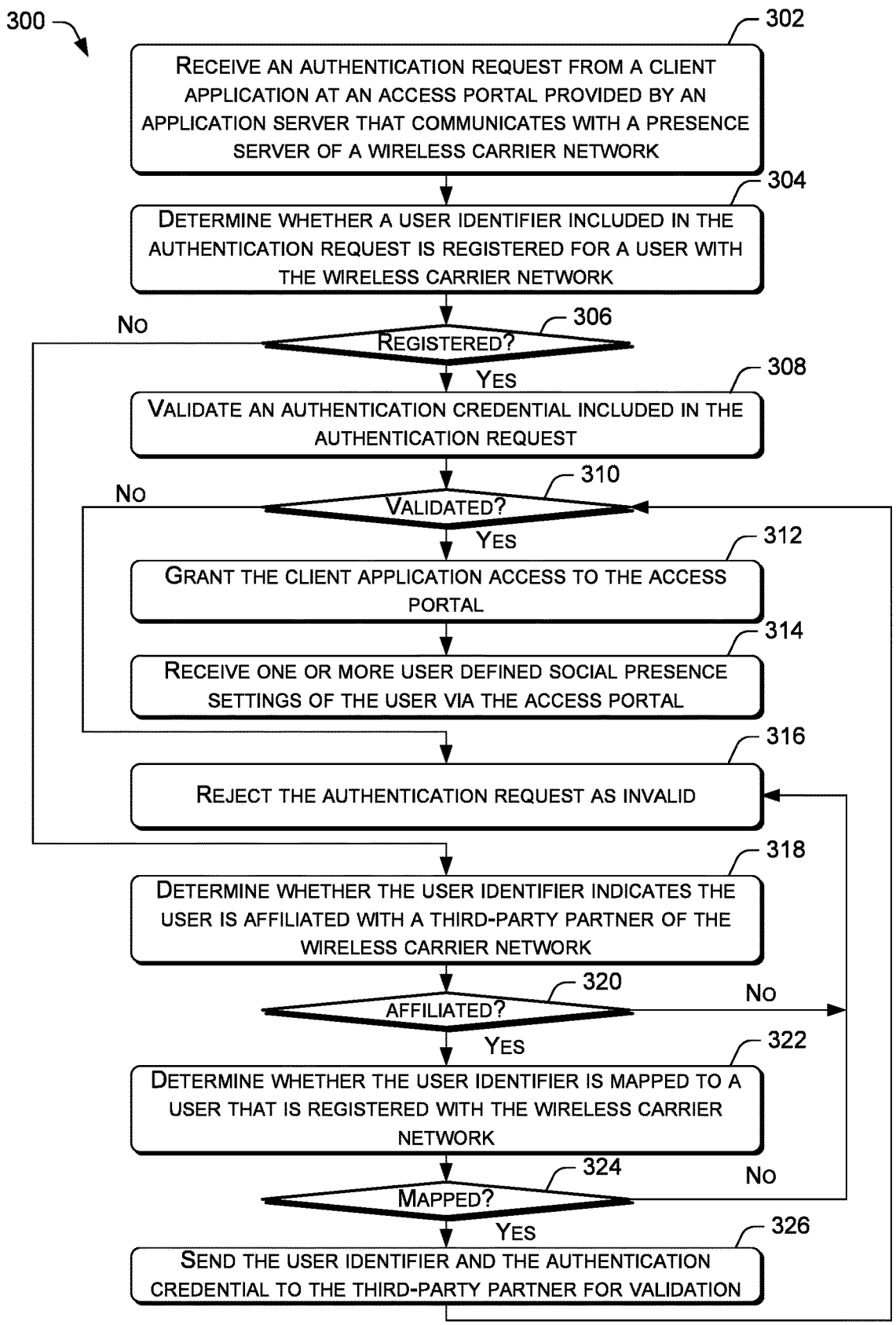
FIG. 3 is a flow diagram of an example process for authenticating a user for the purpose of performing application server-based social presence publishing for the user.
Figure 4:
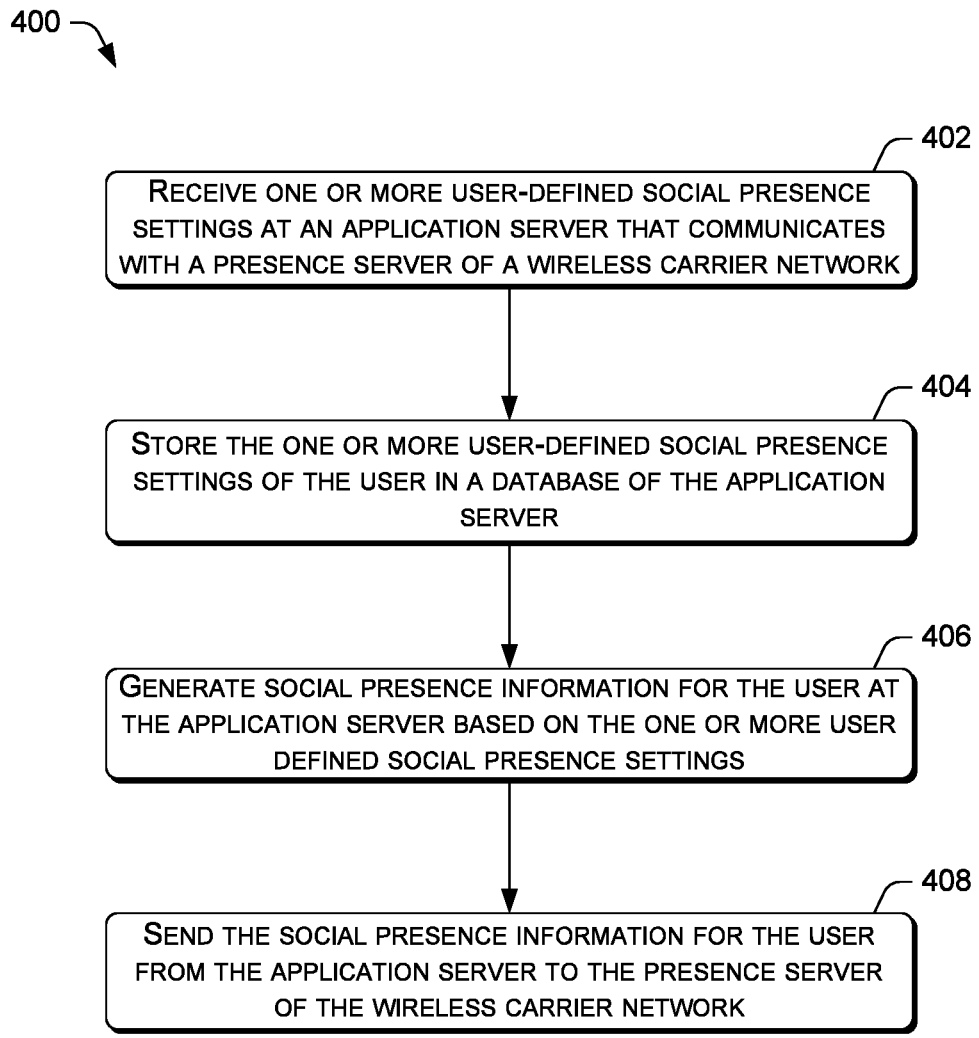
FIG. 4 is a flow diagram of an example process for performing application server-based social presence publishing based on user-defined social presence settings.
Figure 5:
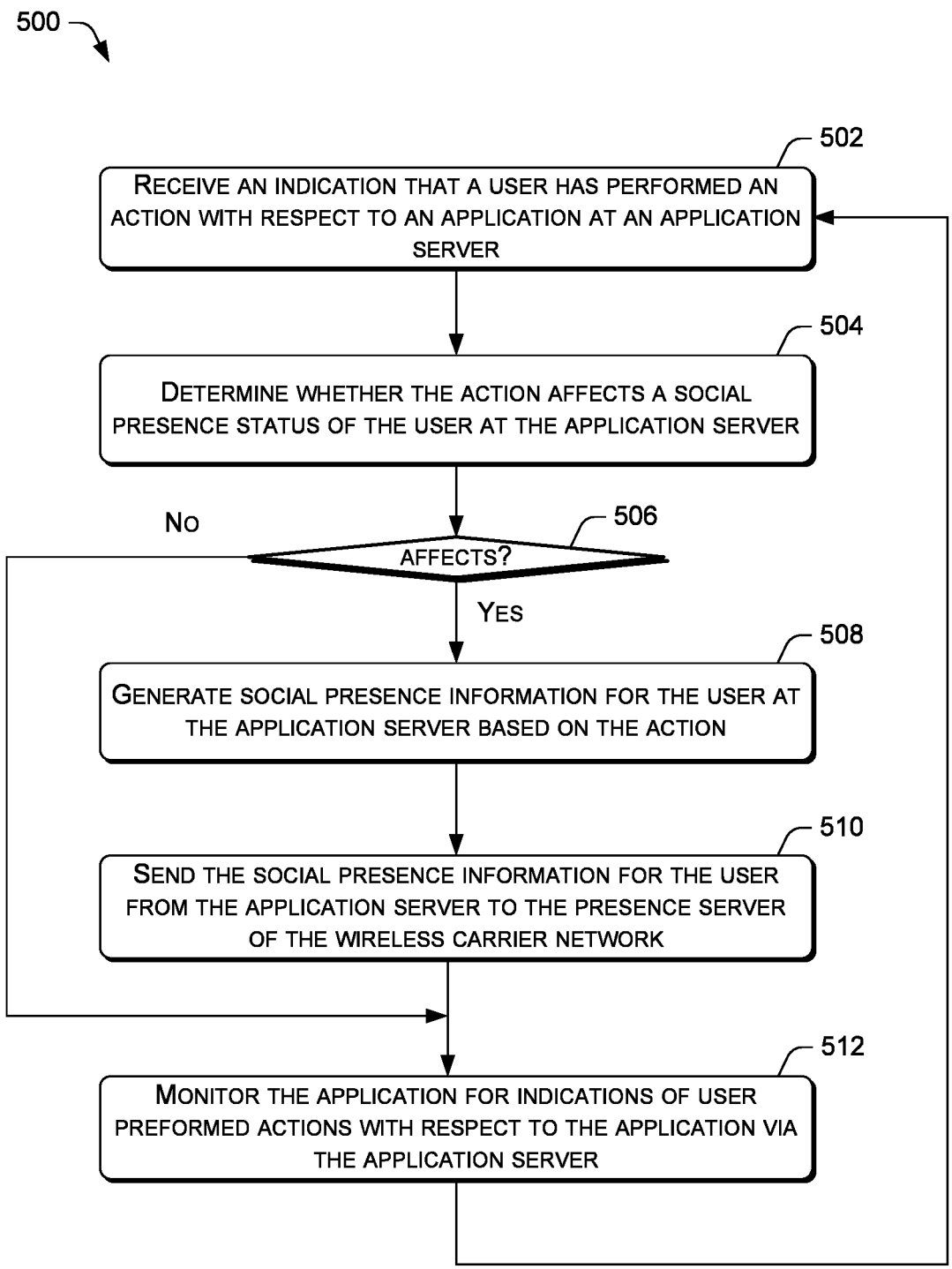
FIG. 5 is a flow diagram of an example process for performing application server-based social presence publishing based on implicit user action.

FIGS. 3-5 present illustrative processes 300-500 for implementing application server-based social presence publishing. Each of the processes 300-500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-500 are described with reference to the network architecture 100 of FIG. 1.

FIG. 3 is a flow diagram of an example process 300 for authenticating a user for the purpose of performing application server-based social presence publishing for the user. At block 302, the application server 200 that communicates with a presence server of the wireless carrier network 106 may receive an authentication request from a client application at an access portal provided by the application server 200. In various embodiments, the access portal may be a web portal that is implemented using Web Real-Time Communication (WebRTC) or application program interfaces (APIs). The client application may be a web client application or a web browser that is capable of accessing the access portal.

At block 304, the application server 200 may determine whether a user identifier included in the authentication request is registered for a user with the wireless carrier network 106. In various embodiments, the user may register the user identifier with the wireless carrier network 106 by establishing a corresponding customer account using authentication information that includes the user identifier and an authentication credential. The authentication credential may be a password, biometric data, or some other user secret. At decision block 306, if the application server 200 determines that the user identifier is registered for a user with the wireless carrier network ("yes" at decision block 306), the process 300 may proceed to block 308.

At block 308, the application server 200 may validate an authentication credential included in the authentication request. In various embodiment, the validation may be performed by comparing the authentication credential to a stored authentication credential for the user. At decision block 310, if the application server 200 determines that the authentication credential is validated ("yes" at decision block 310), the process 300 may proceed to block 312. At block 312, the application server 200 may grant the client application access to the access portal. The access portal may provide an interface that enables a user to input one or more social presence settings. At block 314, the application server 200 may receive one or more user-defined social presence settings of the user via the access portal.

Returning to decision block 306, if the application server 200 determines that the user identifier is not registered for a user with the wireless carrier network ("no" at decision block 306), the process 300 may proceed to block 318. At block 318, the application server 200 may determine whether the user identifier indicates the user is affiliated with a third-party partner of the wireless carrier network 106. In various embodiments, the application server 200 may use a portion of the user identifier (e.g., an email suffix, a domain name, etc.) to determine that the user identifier indicates that the user is affiliated with the third-party partner. At decision block 320, if the application server 200 determines that the user identifier indicates that the user is affiliated with a third-party partner of the wireless carrier network ("yes" at decision block 320), the process 300 may proceed to block 322. At block 322, the application server 200 may determine whether the user identifier is mapped to a user that is registered with the wireless carrier network. In various embodiments, the application server 200 may use the accounts information stored for various users to determine whether the user identifier maps to a user that is registered with the wireless carrier network 106. At decision block 324, if the application server 200 determines that the user identifier is mapped to a user that is registered with the wireless carrier network ("yes" at decision block 324), the process 300 may proceed to block 326. At block 326, the application server 200 may send the user identifier and the authentication credential to the third-party partner for validation. Subsequently, the process 300 may loop back to decision block 310.

Returning to decision block 310, if the application server 200 determines that the authentication credential is not validated ("no" at decision block 310), the process 300 may proceed to block 316. At block 316, the application server 200 may reject the authentication request as invalid. Returning to decision block 320, if the application server 200 determines that the user identifier indicates that the user is not affiliated with a third-party partner of the wireless carrier network ("no" at decision block 320), the process 300 may also proceed to block 316, so that the authentication request is rejected. Returning to decision block 324, if the application server 200 determines that the user identifier is not mapped to a user that is registered with the wireless carrier network ("not" at decision block 324), the process 300 may also proceed to block 316, so that the authentication request is rejected.

FIG. 4 is a flow diagram of an example process 400 for performing application server-based social presence publishing based on user-defined social presence settings. At block 402, the application server 200 that communicates with a presence server of the wireless carrier network 106 may receive one or more user-defined social presence settings of a user. In various embodiments, the one or more social presence settings may specify a location status, a social presence status, a date and time range for implementation of the social presence status, a communication capability status, and/or so forth. At block 404, the application server 200 may store the one or more user-defined social presence settings of the user in a database of the application server 200. At block 406, the application server 200 may generate social presence information for the user based on the one or more user-defined social presence settings. In various embodiments, the generation may be performed by a conversion algorithm that converts the one or more social presence settings into presentable social presence information. At block 408, the application server 200 may send the social presence information to the presence server of the wireless carrier network 106. In various embodiments, the social presence information may be sent via a SIP PUBLISH request that is routed to the presence server via the S-CSCF 118 of the wireless carrier network 106.

FIG. 5 is a flow diagram of an example process 500 for performing application server-based social presence publishing based on implicit user action. At block 502, the application server 200 may receive an indication that a user has performed an action with respect to an application. In various embodiments, the application may be hosted by the application server 200 or another application server. The indication may be a notification sent by a monitoring function of the application. At block 504, the application server 200 may determine whether the action affects a social presence status of the user. In various embodiments, the determination may be performed using an action mapping database that specifies that certain actions may result in a generation of social presence information, while other actions do not result in such generation. At decision block 506, if the application server 200 determines that the action affects the social presence status of the user ("yes" at decision block 506), the process 500 may proceed to block 508. At block 508, the application server 200 may generate social presence information for the user based on the action. In various embodiments, the generation of the social presence information may be performed using the action mapping database.

At block 510, the application server 200 may send the social presence information for the user to the presence server of the wireless carrier network 106. In various embodiments, the social presence information may be sent via a SIP PUBLISH request that is routed to the presence server via the S-CSCF 118 of the wireless carrier network 106. The social presence information may include a location of the user, a social presence status of the user, a communication capability status of the user, and/or so forth. At block 512, the application server 200 may monitor the application for indications of user performed actions with respect to the application. Subsequently, the process 500 may loop back to block 502.

Returning to decision block 506, if the application server 200 determines that the action does not affect the social presence status of the user ("no" at decision block 506), the process 500 may proceed directly to block 512, so that additional indications of user performed actions may be monitored.

The use of application servers to publish the social presence information of users to a presence server of the wireless carrier network may reduce signaling and communication traffic between user devices and the wireless carrier network. Such reductions in signaling and communication traffic may increase the available communication bandwidth of the wireless carrier network for handling other communication tasks. Further, application server-based social presence publishing makes it possible for users to broadcast their social presence information to other users even when their user devices are unable to or are restricted from supporting social presence client applications, when the user devices are offline, or when the users are using incompatible social presence client applications.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. One or more non-transitory computer-readable media of an application server storing computer-executable instructions that upon execution cause one or more processors to perform acts comprising:
receiving one or more user-defined social presence settings of a user as inputted via a web browser or a web client application on a user device at a web portal provided by the application server, the one or more user-defined social presence settings inputted at the web portal indicating a future absence of the user from a location during a specific date and time range;
in response to determining that a start date of the specific date and time range has arrived, generating social presence information for the user based on the one or more user-defined social presence settings at the application server, the social presence information at least indicating that the user is absent from the location during the specific data and time range; and
sending the social presence information for the user from the application server to a presence server of a wireless carrier network.

2. The one or more non-transitory computer-readable media of claim 1, wherein the acts further comprise storing the one or more user-defined social presence settings in a social profile database that is accessible to another application server that sends social presence information to the presence server.

3. The one or more non-transitory computer-readable media of claim 1, wherein the sending includes sending the social presence information to the presence server for broadcast to one or more social presence client applications on one or more user devices.

4. The one or more non-transitory computer-readable media of claim 1, wherein the sending includes sending the social presence information via a Session Initiation Protocol (SIP) PUBLISH request to a Serving Proxy Call Session Control Function (S-CSCF) of the wireless carrier network for routing to the presence server of the wireless carrier network.

5. The one or more non-transitory computer-readable media of claim 1, wherein the acts further comprise receiving additional social presence information from a social presence client application on a user device of the user.

6. The one or more non-transitory computer-readable media of claim 1, wherein the web portal is implemented via Web Real-Time Communication (WebRTC).

7. The one or more non-transitory computer-readable media of claim 1, wherein the acts further comprise receiving an authentication request at the web portal that includes a user identifier that is registered for the user with the wireless carrier network, and wherein the receiving includes receiving the one or more user-defined social presence settings via the web portal when an authentication credential included in the authentication request is validated by the application server.

8. The one or more non-transitory computer-readable media of claim 1, wherein the acts further comprise receiving an authentication request at the web portal that includes a user identifier that is affiliated with a third-party partner of the wireless carrier network and mapped to the user at the wireless carrier network, and wherein the receiving includes receiving the one or more user-defined social presence settings via the web portal when an authentication credential included in the authentication request is validated by the third-party partner.

9. The one or more non-transitory computer-readable media of claim 1, wherein the application server is a telephony application server (TAS) of the wireless carrier network or a third-party server that communicates with the presence server of the wireless carrier network.

10. The one or more non-transitory computer-readable media of claim 1, wherein the one or more user-defined social presence settings include at least one of a location status, the specific date and time range, and a social presence status for implementation during the specific date and time range, or a communication capability status during the specific date and time range.

11. A presence server, comprising:
one or more processors; and
memory having instructions stored therein, the instructions, when executed by the one or more processors, cause the one or more processors to perform acts comprising:
receiving social presence information of a user from an application server, the social presence information being generated by the application server based on one or more user-defined social presence settings of the user as inputted at a web portal that is provided by the application server, the one or more user-defined social presence settings inputted at the web portal indicating that a future absence of the user from a location during a specific date and time range, wherein generation of the social presence information by the application server is triggered by an arrival of a start date of the date and time range;
receiving a subscribe request for the social presence information of the user from a social presence client application on a user device; and
sending the social presence information of the user to the social presence client application in response to the subscribe request, the social presence information at least indicating that the user is absent from the location during the specific data and time range.

12. The presence server of claim 11, wherein the receiving the social presence information includes receiving the social presence information via a Session Initiation Protocol (SIP) PUBLISH request that is routed by a Serving Proxy Call Session Control Function (S-CSCF) to a presence server.

13. The presence server of claim 11, wherein the acts further comprise receiving additional social presence information from a social presence client application on a user device of the user.

14. The presence server of claim 11, wherein the one or more user-defined social presence settings are converted by a conversion algorithm into the social presence information at the application server.

15. The presence server of claim 11, wherein the application server is a telephony application server (TAS) of a wireless carrier network or a third-party server that communicates with the presence server.

16. The presence server of claim 11, wherein the one or more user-defined social presence settings include at least one of a location status, the specific ate and time range, and a social presence status for implementation during the specific date and time range, or a communication capability status during the specific date and time range.

17. A computer-implemented method, comprising:
receiving, at an application server, an indication from an application that a user has performed an action with respect to the application, the action including initiating or exiting a screen share function at a user device for a web meeting;
generating, at the application server, social presence information for the user based on the action via a mapping of the action to the social presence information in a mapping database; and
sending, via the application server, the social presence information for the user from the application server to a presence server of a wireless carrier network.

18. The computer-implemented method of claim 17, wherein the sending includes sending the social presence information via a Session Initiation Protocol (SIP) PUBLISH request to a Serving Proxy Call Session Control Function (S-CSCF) of the wireless carrier network for routing to the presence server of the wireless carrier network.

19. The computer-implemented method of claim 17, wherein the social presence information includes at least one of a location of the user, a social presence status of the user, or a communication capability status of the user.

20. The computer-implemented method of claim 17, wherein the application server is a telephony application server (TAS) of the wireless carrier network or a third-party server that communicates with the presence server of the wireless carrier network.

* * * * *